United States Patent [19]
Letemps et al.

[11] Patent Number: 5,562,750
[45] Date of Patent: Oct. 8, 1996

[54] PROCESS AND APPARATUS FOR THE PRODUCTION OF CURVED SHEETS

[75] Inventors: Bernard Letemps, Thourotte; Jacques Leclercq, Roisel, both of France

[73] Assignee: Saint-Gobain Vitrage International, Courbevoie, France

[21] Appl. No.: 312,078

[22] Filed: Sep. 26, 1994

Related U.S. Application Data

[63] Continuation of Ser. No. 64,434, May 21, 1993, abandoned.

[30] Foreign Application Priority Data

May 21, 1992 [FR] France ................................. 92 06171

[51] Int. Cl.6 ................................................. C03B 23/033
[52] U.S. Cl. ................................ 65/107; 65/104; 65/106; 65/26; 65/245
[58] Field of Search .......................... 65/25.4, 107, 104, 65/106, 182.2, 268, 245, 253

[56] References Cited

U.S. PATENT DOCUMENTS

| | | |
|---|---|---|
| 3,526,489 | 9/1970 | McPhail ................................ 65/182.2 |
| 4,292,065 | 9/1981 | Nedelec et al. . |
| 4,378,988 | 4/1983 | Presta ................................... 65/182.2 |
| 4,540,426 | 9/1985 | Bocelli et al. . |
| 4,820,327 | 4/1989 | Letemps et al. . |
| 4,853,019 | 8/1989 | Blank et al. ............................. 65/106 |
| 5,236,487 | 8/1993 | Letemps et al. ......................... 65/104 |

*Primary Examiner*—Donald E. Czaja
*Assistant Examiner*—Calvin Padgett
*Attorney, Agent, or Firm*—Oblon, Spivak, McClelland, Maier & Neustadt, P.C.

[57] ABSTRACT

Glass sheets which have been heated to bending temperature are bent by passing the glass sheets over a shaping bed having a substantially circular or substantially conical profile of revolution as seen in the longitudinal direction of the shaping bed. The shaping bed is composed of an assembly of revolving elements adapted for driving the glass sheets and at least one hot air cushion acting on the glass sheets in the first part of the bending zone.

16 Claims, 2 Drawing Sheets

PROCESS AND APPARATUS FOR THE PRODUCTION OF CURVED SHEETS

This application is a Continuation of application Ser. No. 08/064,434, filed on May 21, 1993, now abandoned.

BACKGROUND OF THE INVENTION

1. Field of the Invention

This invention deals with the techniques of bending glass sheets by passing them over a shaping bed composed of a series of shaping rods, disposed along a path having a profile curved in the direction of travel of the glass sheets. The invention is especially applicable to the production of curved and possibly also toughened automobile panes.

2. Description of the Related Art

The technique referred to above is known from French Patents FR-B-2 242 219 and FR-B-2 549 465 and consists of causing glass sheets, heated in a horizontal furnace, to pass between two layers of rollers—or other revolving elements—disposed along a curvilinear profile and passing through a final toughening zone. For the production of side window panes, opening roofs or other panes of cylindrical shape, the layers as a general rule are formed of straight cylindrical rods disposed along a circular profile. This technique makes possible a very high production capacity because, on the one hand, the glass sheets do not have to be widely spaced apart, it being possible for one glass sheet to enter the shaping zone without problem while the treatment of the preceding sheet is not yet finished and, on the other hand, if the length of the rollers allows, two or three glass sheets may be simultaneously treated abreast.

In the majority of cases, automobile panes have enamelled zones on the internal face, that is to say on the concave side; this enamel is of necessity deposited on that face of the glass sheets which faces upwards in the furnace, in order not to foul the conveyor of the furnace and, indirectly, the other glass sheets. Consequently, the path of the glass sheets must be ascending and the shaping bed has an upward concavity. In these circumstances, the glass sheet "climbs" by a step for each roller of the shaping bed.

To help the glass ascend this shaping bed, it has been proposed, in Patent FR-B-2 549 465, to use an assembly of upper rollers lining the shaping bed. These upper rollers are mounted with springs so as to prevent excessive bearing forces acting upon the glass, the objective being simply to obtain an assistance to the advance and in no way a rolling or pressing effect. However, this is possible only if the upper rollers are absolutely correctly adjusted in position, which presupposes a fairly complex machine. In European Patent Publication EP-B-260 030, it has also been demonstrated that these upper rollers can be eliminated if the speed of travel of the glass plates is high, more exactly at least 10 cm/second and preferably of the order of 15 to 18 cm/second.

By increasing the speed of passage, the time during which a given point of the glass sheet is not supported, because it is between two rollers, is reduced. For this reason, the risk of creating optical defects and bulges due to the formation of small waves is reduced. Everything happens as if the rollers or other equivalent revolving elements were closer together, whereas this physical closeness of the rollers is not permissible, essentially for technical limits resulting, notably, from the size of the pinions and other transmission mechanisms for the rotary movement and the minimum diameter necessary for preventing any deformation of the rollers.

The preferred speed of travel, of the order of 15 to 18 cm/second, also allows good contact between the glass and the rollers, by limiting the risk of slip of the glass relative to the rollers.

The increase in the speed of passage of the glass sheets is, however, limited by a second critical factor. Although an increase in output rates is desirable, the pane must not be allowed to leave the bending and toughening machine without being correctly toughened.

Toughening is carried out as the panes travel through the toughening zone, with glass sheets displaced at the same speed as in the bending zone. The degree of toughening is therefore a direct resultant of the speed of travel of the glass sheet, of the length of the toughening zone and of the temperature of the glass at its entry into the toughening zone.

To operate with a hotter glass in the toughening zone obviously implies a hotter glass in the bending zone, with an accentuation of the phenomena of deformation in the form of small waves referred to above. Furthermore, the length available for the toughening zone must be made shorter if the radius of curvature to be given to the glass sheet is reduced, since the discharge of the glass sheet from the bending/toughening machine must be carried out no later than after the glass sheets have travelled through a quarter of a revolution, and therefore before they return backwards. For a radius of curvature of 1 meter, it being understood that the length of the bending zone must of the order of 30 centimeters, the toughening zone can have at most a length of approximately 1.25 m.

In relatively standard blowing conditions and for a glass sheet of 3.2 m thickness, which must comply with the requirements of European Regulation No. 43 relating to the approval of safety glass and of the materials for panes intended to be fitted to motor vehicles and their trailers, the toughening stresses must be such that the pane exhibits, in the case of breakage, a number of fragments which, in any square of 5×5 cm, is neither less than 40 nor greater than 350 (this number raised to 400 for panes of a thickness less than or equal to 2.5 mm). Still according to these requirements, none of the fragments must be of more than 3.5 cm$^2$, except possibly in a band of 2 cm width along the periphery of the pane and within a radius of 7.5 cm around the point of impact, and no elongate fragment of more than 7.5 cm length shall exist.

In order to satisfy these requirements, a glass sheet must remain in the toughening zone of the bending machine for a period of at least 5 seconds, which leads to a calculation of a limiting speed of passage of the glass sheets of 25 cm/second.

By comparison with the preferred speed of travel indicated earlier, this evidently gives a comfortable operating margin, and this requirement is effectively complied with for rectangular or essentially rectangular panes, for which the maximum distance between two points unsupported by the rollers corresponds to the distance between centers of these rollers. In contrast, if the pane has an oblique edge making an angle with the direction of travel of the glass sheets, this distance increases in inverse proportion to the cosine of this angle. With an edge at 30°, an identical support for the points of the edge would require a speed of travel of between 30 and 36 centimeters/second, and would therefore be unacceptable. Calculation shows that the limiting speed of 25 centimeters/second is reached as soon as the angle is less than 45°, which explains the appearance of defects of the scallop type at the edges. And it is self-evident that it is not possible to overcome this problem by modifying the position of the glass sheet relative to this direction of travel, because this direction also determines the principal direction of the curvature given to the sheet.

SUMMARY OF THE INVENTION

The invention has as an object a modification of the bending/toughening technique referred to earlier, for the purpose of improving the quality of the curvature and the optical quality of the panes produced, with the elimination of the scalloped edge effect in the case of triangular panes or panes of any shape having an oblique edge.

This problem is solved according to this invention by a process for bending glass sheets, preheated to bending temperature, which consists of causing them to pass over a shaping bed having a profile that is substantially circular or a cone of revolution as viewed in the longitudinal direction of the shaping bed, said shaping bed being composed of an assembly of revolving elements adapted for entraining the glass sheets and at least one hot air cushion acting on the glass sheets, at least in the first part of the bending zone.

From the foregoing definition, it follows that the glass sheet is essentially shaped by means of the hot air cushion. This cushion can act on the lower face, the upper face or on both faces of the glass sheet.

With a hot air cushion acting solely on the lower face, it is necessary to provide upper means, for example small rollers, suitable for holding the glass sheet against the revolving elements which drive it through the bending machine. For the reasons indicated earlier, these upper means create a disadvantage. But, nevertheless, the hot air cushion contributes to a higher quality of the shaping. It should be noted that this lower hot air cushion may, in fact, be composed of a series of hot air cushions mounted in the interstitial spaces between the revolving elements which are, for example, of the straight rod or contraflexed rod type.

The second and more advantageous case is that of a hot air cushion acting on the upper face of the glass sheet over substantially its entire width. This supplements the effect of gravity and, for this reason, improves the driving capability of the revolving elements of the shaping bed. For this reason, it will be possible to increase the speed of passage of the glass without increasing the risks of slipping (skating), thus enabling the speed of travel of the glass sheets to be systematically optimized as a function of the time which can be devoted to the thermal toughening. In these conditions, the speed of travel of the glass sheets will be able to reach a value of the order of 25 cm/second, which is very favorable to its optical quality. Furthermore, the hot air cushion does not lead to any risk of optical marking of the face of the glass in contact, that is to say the upper face, which is generally the enamelled one. The term hot air is to be understood here as meaning air raised to a temperature relatively close to the bending temperature of the glass sheets; this hot air leads to another, quite especially advantageous, effect of this invention, i.e., reduced cooling of the glass sheet during the bending sequence with, as a consequence, the possibility of operating with a slightly cooler glass at the exit from the furnace without jeopardizing the toughening but reducing the risk of undulations by reason of the greater stiffness of the glass plate.

It should be emphasized that, with a bending machine in ambient atmosphere, the rate of cooling of the glass is of the order of 7° to 8° C. per second, and more than 10° C. during the bending. At the temperatures considered, such cooling leads to an increase by a factor of more than three in the viscosity, which is certainly prejudicial to the bending process.

It is important, above all, to exert a bending force upon the glass sheet right at the start of the bending zone, while the glass sheet is still to a large extent entrained by the last rollers of the reheating furnace, which rollers are disposed in a horizontal plane, so that the glass sheet possesses a certain rigidity due to its flat rear part. Nevertheless, if only to benefit to the maximum from the thermal effect of the hot air, the upper hot air cushion preferably covers the entire bending zone.

This variant of the invention is especially preferred in the case which is the most common, i.e., that in which the bending is followed by a thermal toughening by jets of cooling gas blown onto both faces of the glass via upper and lower nozzles, interspaced between the revolving elements disposed in the last part of the shaping bed.

According to another especially advantageous embodiment of this invention, two hot air cushions act on either side of the glass sheet. In this way, the thermal effect is still further improved and a complementary support can be provided for the glass that remains unsupported by the rollers, without creating faults in driving the glass sheet, which remains held against the rollers by means of the upper hot air cushion. The lower hot air cushion will thus create a certain number of supplementary support points which limit the scalloping of the edges. Moreover, the optical quality is assured by the high speed made possible by the upper hot air cushion. In this embodiment, the glass sheet is shaped between the hot air cushions, the rollers serving only for its mechanical driving, the weight of the glass being supported by the air cushions. As a subsidiary function, these rollers are precise reference points, the mechanical precision which can be applied in the positioning of a roller having no simple equivalent for an air cushion.

Advantageously, the hot air cushions may have a slight transverse curvature, identical to the transverse curvature which it is desired to give to the glass sheet.

The present invention also has as its object a bending installation, comprising a shaping bed composed of an assembly of revolving elements, notably of the roller type, disposed along a profile that is substantially circular or substantially a cone of revolution as viewed in the longitudinal direction of said shaping bed, and at least one means for generating a hot air cushion above and/or below said shaping bed.

These means for generating hot air cushions are, for example, series of elongate hollow elements, possibly juxtaposed to form the upper air cushion and closed by a wall formed of a porous material, which advantageously may be shaped by machining, said elongate elements being, preferably, wrapped in a fabric of high-temperature resistant fibers protecting the porous wall in the case of breakage of the pane.

The hot air cushions used according to this invention should have a low lift height, preferably between 0.2 and 2 mm, and be relatively hard, that is to say the passage of the glass sheet should virtually not affect the depth of the air cushion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
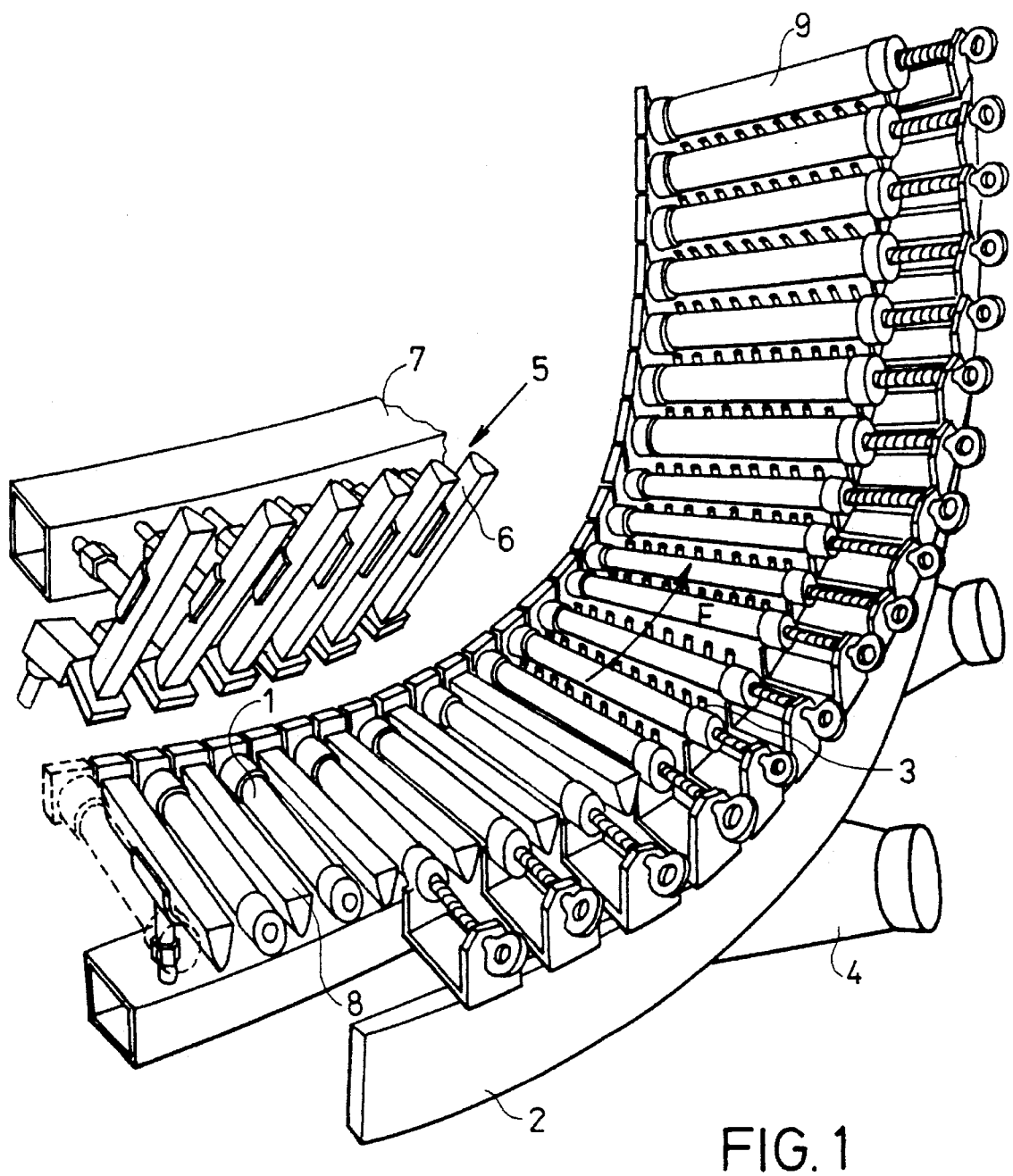
FIG. 1 is a partial perspective view of a bending apparatus according to this invention.

FIG. 1 illustrates the basic principle of the bending process according to this invention, applied in the present case to a bending machine comprising a shaping bed, the shaping rods 1 of which, preferably of the straight cylindrical roller type, are disposed along a circular profile defined by arcs 2 in the direction of travel of the glass sheets indicated by the arrow F. The concavity of the bed is upwards. The bending machine is disposed immediately downstream of a plane conveyor for feeding the glass sheets heated to bending temperature; to avoid the optical deformations that would result from a discontinuity in the path followed by the glass sheets, the curve of the shaping bed is tangential to this feed conveyor, not shown here. The rollers are disposed parallel to one another in order to obtain a cylindrical pane. They are driven in rotation, for example by a set of chains acting on pinions fitted to the end of the rollers and driven from a drive shaft.

The first 7 rollers of the machine define the shaping zone. The succeeding rollers form part of the toughening zone and between them there are disposed blowing nozzles 3, supplied from blowing boxes 4, which project a cooling gas, generally air, towards the lower face of the glass sheet. Opposite the lower blowing nozzles there are provided upper blowing nozzles, not shown here for reasons of clarity, which project cooling gas towards the upper face of the glass sheet. To allow good discharge of the toughening air, the rollers of the toughening zone are more widely spaced, at least downstream of the first part of this toughening zone, and therefore from the instant at which the glass has already become sufficiently cooled for its shape to be fixed. Moreover, in this toughening zone, for every roller of the shaping bed there corresponds an upper roller, also not shown. In this toughening zone it is preferable not to eliminate the upper rollers because the advance of the glass sheet is retarded by the blowing of the cooling gases and in any case the glass here is colder and therefore the upper rollers can no longer have harmful effects.

As can be seen from FIG. 1, the first 7 rollers of the bending machine are not associated with upper rollers, the absence of the latter being, as indicated in European Patent EP-B-263 030, compensated by a speed of travel of the glass sheets of at least 10 cm/second and preferably between 15 and 25 cm/second, made possible by the upper air cushion which prevents slipping, the speed of travel being greater, the thinner the glass sheet. Nevertheless, when the glass sheet has an oblique edge and/or when the radius of curvature of the bending machine is especially small, some defects of curvature may appear which, according to the present invention, can be compensated by slightly increasing the gravitational effect by means of the upper air cushion 5, produced in the present case by juxtaposing a series of elements 6 supplied from a common pipe 7.

At the approach to the toughening zone, this upper air cushion should be interrupted to allow room for the upper rollers above the lower rollers, which upper rollers will assist the glass to enter the toughening zone in spite of the contrary force generated by the continuously blown cooling gases. It should be noted that, at a minimum, only one or two upper rollers are provided in the first part of the toughening zone, and that these will serve as a barrier against the penetration of the cooling gases into the bending zone. It is also possible to provide upper rollers in the bending zone as well, but to maintain an air cushion between each of the upper rollers of this zone. For a cylindrical bending, this solution is not preferred, but nevertheless it may prove advantageous if the rollers are shaped rollers or if auxiliary rollers are provided, notably for the purpose of producing panes having sharply curved corners.

This latter point is especially important if, as in the embodiment shown in FIG. 1, air cushions 8 are also provided between the lower rollers of the shaping bed. These lower air cushions have, in fact, a tendency to lift the glass sheet which can lead to a risk of pressing it against the upper rollers if a contrary force is not exerted.

The last roller 9 of the shaping bed is provided with a tilting assembly, for example like that described in French Patent FR-A-2 549 465, which delivers the bent and toughened glass sheets onto a substantially plane conveyor, which may pass through a blowing zone for a secondary cooling.

Figure 2:
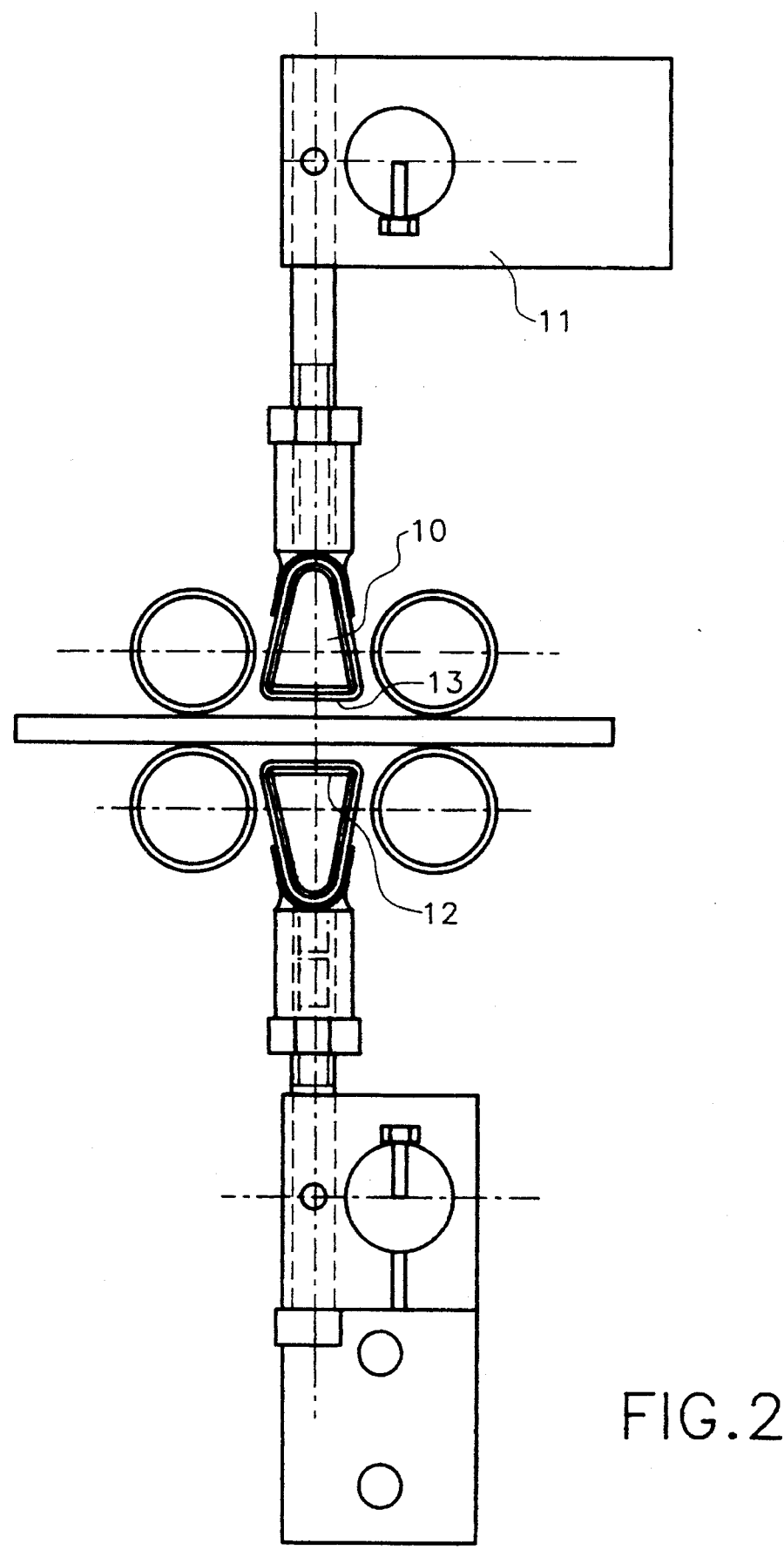
FIG. 2 is a detail of FIG. 1.

As will be seen in more detail from FIG. 2, the air cushion or various air cushions are preferably produced from elongate hollow elements 10 corresponding to elements 6 of FIG. 1, connected to a hot air feed device 11 (7), these elements being closed by a porous wall 12, if necessary trued by machining. The use of such a material makes it very easy to obtain air cushions adapted to shaping beds which are not perfectly cylindrical and which have, for example, a very slight transverse curvature, shaping beds which in this case are formed not of straight cylindrical rods, but for example of bulging or diabolo-shaped rollers.

It may also be noted that, in this case, the invention is especially advantageous because it effectively allows the upper elements to be omitted, the elimination of these elements being possible only if the drive by the lower rollers is sufficiently effective.

To prevent damage to this porous wall if the pane should be broken during toughening, the elongate elements are preferably wrapped in a protective cloth 13 permeable to air and made of high-temperature-resistant fibers.

These elongate elements are preferably constructed in a standardized manner, the upper air cushion in the shaping zone being produced simply by juxtaposing the desired number of elements. Such an arrangement enables the problems of replacement of worn components to be simplified.

As an example, it has been possible to construct a bending machine with elongate elements of 15 mm width (width of the wall face forming the air cushion), disposed 5 mm from the glass sheet, between straight rollers of 30 mm diameter mounted at a center-to-center spacing of 50 mm. In the case where both lower and upper air cushions are provided, this center spacing may be further increased without affecting the quality of the panes, the rollers serving basically for fixing reference points. The air cushions used are of great stiffness, with a ratio between the air pressure in the box and the air pressure of the cushion of at least 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Process for bending glass sheets, comprising the steps of:

passing the glass sheets over a shaping bed having a curved profile as viewed in a longitudinal direction thereof, said shaping bed comprising an assembly of revolving elements which entrain the glass sheets and having an upstream portion, said glass sheets having a width in a direction transverse to a direction of movement of the glass sheets; and applying a hot air cushion to at least the upper surface of the glass sheets over substantially the entire width thereof, and at said upstream portion of the shaping bed.

2. The process of claim 1 including the step of blowing cool gas against the glass sheets of a downstream portion of the shaping bed to thermally toughen the glass sheets.

3. The process of claim 2 wherein said hot air applying step continues until the cool air blowing step begins.

4. The process of claim 2 wherein said hot air cushion applying step comprises blowing hot air from beneath the glass sheets, including the step of using upper means for holding the glass sheets in contact with said revolving elements.

5. The process of claim 2 wherein said hot air cushion applying step comprises blowing hot air from both above and beneath the glass sheets.

6. The process of claim 1 wherein said curved profile is circular.

7. The process of claim 1 wherein said curved profile is substantially conical.

8. An apparatus for bending glass sheets, comprising:

a shaping bed having a curved profile as viewed in a longitudinal direction thereof, said shaping bed comprising an assembly of revolving elements which entrain said glass sheets and having an upstream portion, said glass sheets having a width in a direction transverse to a direction of movement of the glass sheets; and means for applying a hot air cushion to at least an upper surface of said glass sheets over substantially the entire width thereof, and entrained by said upstream portion of said shaping bed.

9. The apparatus of claim 8 wherein said hot air applying means comprise elongate hollow elements extending transverse to the longitudinal direction of the shaping bed and having a porous wall.

10. The apparatus of claim 9 wherein said elongate elements are wrapped in a fabric of high temperature resistant fibers.

11. The apparatus of claim 9 wherein the porous wall is between 0.2 mm and 2.0 mm from said glass sheets entrained by said shaping bed.

12. The apparatus of claim 8 including cool air blowing means for tempering glass sheets positioned at a downstream portion of the shaping bed.

13. The apparatus of claim 8 wherein said curved profile is circular.

14. The apparatus of claim 8 wherein said curved profile is substantially conical.

15. The apparatus of claim 8 wherein said upstream portion extends substantially horizontally.

16. The process of claim 1, wherein said hot air cushion applies a force onto the glass sheets which is sufficiently high to permit the glass sheets to pass over the shaping bed at a velocity of about 25 cm/sec without skating and without scalloping.

* * * * *